United States Patent Office 2,783,140
Patented Feb. 26, 1957

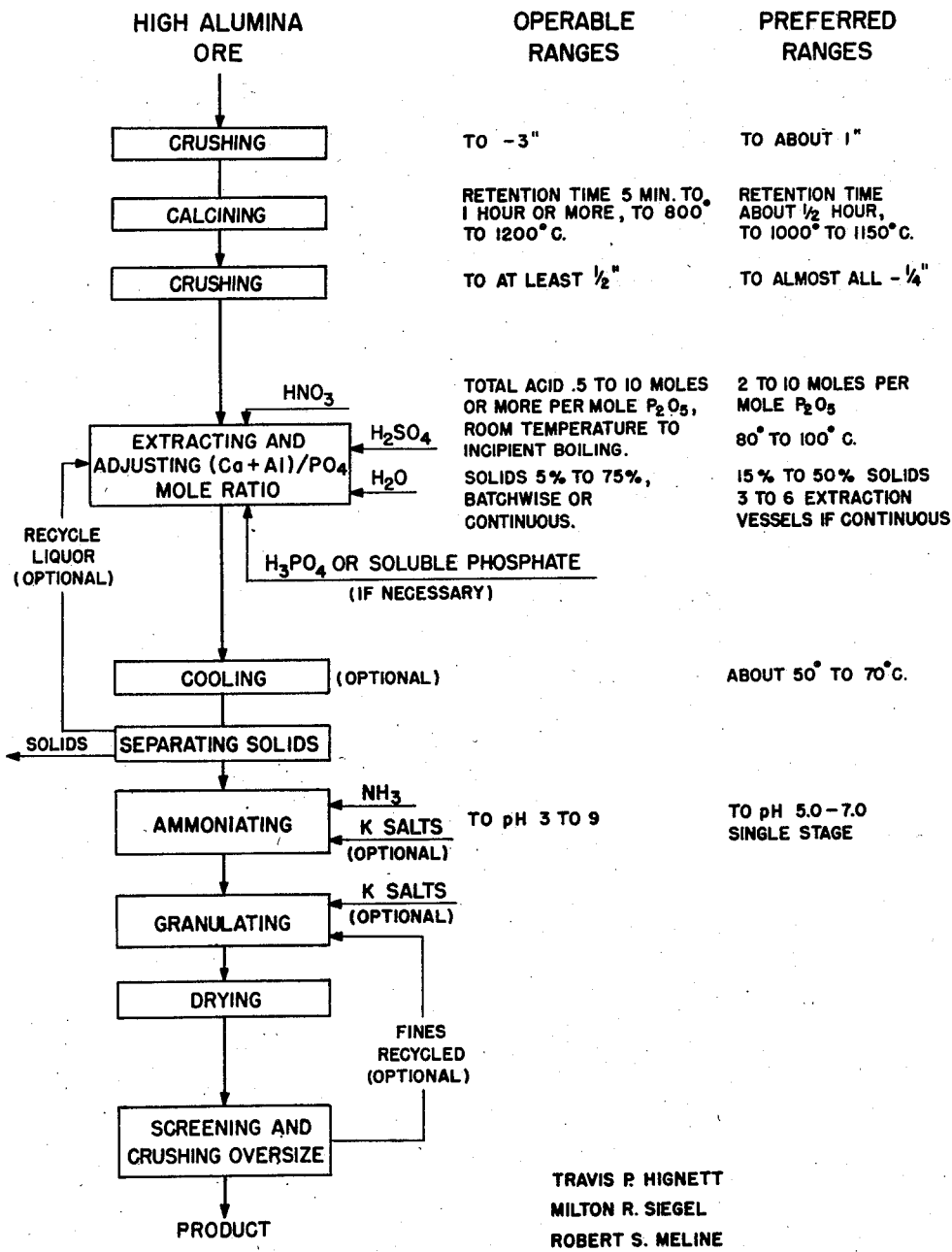

2,783,140

PRODUCTION OF FERTILIZER FROM HIGH-ALUMINA PHOSPHATE ORES

Travis P. Hignett, Sheffield, and Milton R. Siegel, Robert S. Meline, and Thurman M. Kelso, Florence, Ala., assignors to Tennessee Valley Authority, a corporation of the United States Application March 14, 1955, Serial No. 494,299

9 Claims. (Cl. 71—37)

(Granted under Title 35, U. S. Code (1952), sec. 266)

The invention herein described may be manufactured and used by or for the Government for governmental purposes without the payment to us of any royalty therefor.

This invention relates to the production of fertilizers from high-alumina phosphate ores.

It has long been known that large deposits of phosphate ores of high alumina contents exist, but they have been considered worthless as raw materials for fertilizer manufacture. These ores differ widely from the fluorapatite ores ordinarily used in the manufacture of phosphate fertilizers in that a large part of the phosphate is chemically combined with aluminum. As mined, these ores may contain wavellite, pseudowavellite, milliscite, variscite, barrandite, and other aluminiferous phosphate minerals; quartz, clay, and phosphosiderite—with or without fluorapatite.

As an example of this type of ore, the Florida phosphate deposits contain a layer of material called "leached zone ore" in which the principal phosphate minerals are aluminiferous phosphates. The leached zone overlies the phosphate rock matrix, or fluorapatite ore. At present, the leached-zone material is cast aside as overburden waste in the course of mining the matrix from which phosphate rock (fluorapatite) is produced. In mining the leached-zone ore, it is sometimes impossible to make a perfect separation of leached-zone ore and the phosphate matrix. Also, some of the deposits consist of a mixture of leached-zone ore and phosphate matrix. For these reasons the ore as mined often is a mixture of leached-zone ore and matrix. The following are typical analyses of such ores as mined.

| | Percent by weight (dry basis) | | | | | | |
|---|---|---|---|---|---|---|---|
| | $P_2O_5$ | CaO | $Al_2O_3$ | $Fe_2O_3$ | Acid insoluble | F | Loss on ignition |
| Ore A | 14 | 3 | 24 | 2 | 44 | 0.9 | 13 |
| Ore B | 11 | 2 | 15 | 2 | 61 | 0.5 | 8 |
| Ore C | 15 | 11 | 11 | 3 | 51 | 1.2 | 7 |

However, the leached-zone ores vary widely in composition. The alumina content of these ores is sometimes as low as 20 percent of the $P_2O_5$ content and sometimes is well in excess of the $P_2O_5$ content. Lack of an economical method for processing the ore into useful materials has been a hinderance to the use of these deposits.

It is customary to specify low alumina content in phosphate ores purchased for the production of most fertilizers because the quality of the product may be lowered by the presence of much alumina, which interferes especially with physical properties desirable in fertilizers. Stickiness of the product is an especially undesirable property hitherto present in some fertilizers made from high-alumina phosphate ores.

As used in this specification, the term "high-alumina phosphate ore" means a phosphate ore in which 15 percent or more of the $P_2O_5$ is in the form of aluminum phosphate minerals.

It is an object of this invention to provide an economical process for producing fertilizers in which high-alumina phosphate ores may be utilized.

Another object is to provide a method for rapidly and easily separating the phosphate content of such ores from waste materials.

Still another object is to provide a process for preparing fertilizer materials having good physical properties and a high plant-food content from such ores.

Another object is to provide a method for preparing granular, free-flowing homogeneous fertilizers from high-alumina phosphate ores which are noncaking under normal storage conditions and which contain a high proportion of $P_2O_5$ in citrate-soluble form.

Other objects and advantages of our invention will become apparent as this disclosure proceeds.

We have found that homogeneous, free-flowing granular fertilizers containing high proportions of citrate-soluble phosphate and which are noncaking on storage may be prepared from high-alumina phosphate ores formerly discarded as waste material by calcining such an ore at a temperature in the range from about 800° to 1200° C.; crushing the calcined ore; extracting the crushed calcined ore with an aqueous solution of a material selected from the group consisting of nitric acid, sulfuric acid, and mixtures thereof; separating the insoluble residue from the resulting slurry; ammoniating the residue-free liquid; granulating the mixture; and drying the granules produced.

We prefer to calcine such ores, in lumps small enough to pass a 1-inch screen, at a temperature in the range from about 1000° to 1150° C. We have found that three beneficial results are obtained by calcining such ores at temperatures from about 800° to 1200° C.; a large proportion of their aluminum content is rendered insoluble in the acid used for extraction; a much smaller quantity of acid is required to solubilize their phosphate contents; and the acid extracts are filterable and not mere inseparable masses as are otherwise obtained. We also prefer to perform the extraction with a mixture of nitric and sulfuric acids containing enough sulfuric acid to precipitate sufficient calcium to reduce the mole ratio (Ca+Al)/PO₄ in the liquid phase of the extract slurry to less than 1.0. We have found that such mole ratios significantly below 1.0 result in a pronounced increase in the proportion of water-soluble phosphate in the finished product. We have also found that sulfuric acid in the extract slurries increases the filterability of the slurries produced from many ores of this type. We also prefer to ammoniate in a single stage, without cooling. This ammoniation procedure also increases the proportion of water-soluble phosphate in the product.

The attached drawing is a flow sheet illustrating diagrammatically a sequence of steps in the process embodying principles of our invention. Principal novelties are believed to lie in the type of ore used, acid ratios, and critical temperatures, mole ratios, etc., present in the steps of calcination, extraction, separation, and ammoniation, resulting in an easy and economical separation of phosphate from the greater portion of waste materials and increase in water solubility of phosphate in the product. It is also believed that there is a distinct overall novelty in the entire process that results in the production of fertilizers of the good physical properties enumerated above and high plant-food value from such high-alumina phosphate ores. Ore as mined or ore that has been beneficiated can be used.

In the drawing it is shown that a high-alumina ore is passed first to a crushing step. Here the ore is broken up sufficiently to pass through a 3-inch screen, or preferably is crushed fine enough to pass a screen having 1-inch openings. This crushing step is advisable to secure ore of such size that it can be calcined in a reasonable time. Any suitable type of crushing machinery may be used.

The crushed ore is then passed on to a calcining step. Here the ore is completely calcined at a temperature in the range from about 800° to 1200° C., preferably from about 1000° to 1150° C. While the operable temperature range here is rather broad, it is nevertheless critical, since we have found that calcination at temperatures much below 800° C., for example 750° C., results in formation of an unfilterable mass in an extraction step to be described later and also requires a much larger quantity of acid to render the phosphate content of the ore soluble than is required for ores calcined at the temperatures specified above. We have found that calcination at a temperature significantly above 1200° C., for example 1250° C., results in conversion of a considerable part of the phosphate content of such ores to a form that is not extracted by acids in the later extraction step. Calcination within the ranges specified above, instead of a lower temperature, converts a large part of the aluminum content of such ores to acid-insoluble form. This is a highly beneficial result, since this insoluble alumina can be easily separated from the extract slurry produced later and can be discarded. This alumina, if left in, would add nothing to the plant-food content of the fertilizer and would act as a diluent in the product.

The minimum time required for complete calcination depends upon the size of the lumps, the type of equipment, and other factors. Calcination for more than the minimum time is not harmful. If a rotary kiln is used, the minimum time required may be anything in the range from 5 minutes to 1 hour or more, very fine ore usually requiring only a few minutes and larger size material requiring a longer time. With ore of the preferred size—to pass a 1-inch screen—the largest lumps are usually completely calcined at a retention time of not over one-half hour, and while the smaller lumps present are completely calcined in less time they are not damaged by retention at calcining temperature for the remainder of this period.

The resulting calcined ore is then passed to a second crushing step where it is crushed at least fine enough to pass a ½-inch screen, preferably fine enough that almost all of it will pass through a standard ¼-inch screen.

This crushed ore then is passed to an extraction step. Here it is extracted with a material selected from the group consisting of nitric acid, sulfuric acid, and mixtures thereof to form a slurry in which substantially all the phosphate content of the ore is dissolved in the liquid phase. A large part of the alumina is present as insoluble material and in a physical form easily separated from the liquid phase by filtration, centrifuging, or any other method for separating solid from liquids that may be convenient to use.

When either nitric acid or sulfuric acid is used alone, the proportion of acid may be anything in the range from 0.5 to 10.0 or more moles of acid per mole of $P_2O_5$ present in the ore, depending on the grade of fertilizer desired as final product. We have found, however, that less than 90 percent of the $P_2O_5$ present in the ore will be solubilized if less than 1.5 moles of nitric acid or less than 2.0 moles of sulfuric acid per mole of $P_2O_5$ are used. If over about 10.0 moles of nitric acid per mole of $P_2O_5$ are used, the ratio of nitrogen to $P_2O_5$ in the fertilizer product is higher than usually desirable. We prefer to use from about 2.0 to 10.0 moles of acid per mole of $P_2O_5$ for these reasons. When using minimum proportions of acid, the presence of nitric acid in the extraction mixture greatly improves solubilization of the phosphate.

The extraction is best performed by agitating the fine ore with an aqueous solution of the acid at any temperature from room temperature to incipient boiling. The total quantity of this solution should be such that the extraction mixture will contain from 5 to 75 percent of solid matter. We prefer that it should contain from 15 to 50 percent of solids, since slurries of this composition are easily handled in the succeeding steps. We also prefer to maintain the temperature in the range from about 80° to 100° C. during extraction, as solubilization of phosphate is rapid and complete and loss of nitrogen from nitric acid is avoided in this range; but the extraction can be conducted at any temperature from room temperature to incipient boiling. Addition of external heat is usually required to maintain this preferred temperature range.

The time required for extraction may be anything from about 5 minutes to 120 minutes or longer; but it is usually from about 15 to 90 minutes, depending on the particular ore, the size of particles, the quantity of acid used, and the temperature.

We have found that superior products result when the mole ratio of $(Ca+Al)/PO_4$ in the liquid phase of the extract slurry is reduced to less than 1.0. These products have greatly increased proportions of their phosphate contents in water-soluble form when the $(Ca+Al)/PO_4$ mole ratio is significantly below 1.0. This reduction of the $(Ca+Al)/PO_4$ mole ratio can be accomplished in either of two ways: by extracting in the presence of sufficient sulfuric acid to precipitate enough calcium to accomplish the desired reduction, or by increasing the quantity of phosphate radical in the slurry by addition of phosphoric acid or other soluble material containing the phosphate radical. The former is the method of choice if it is operable; but the liquid phase of the slurries produced from some ores contains so much aluminum that the desired reduction of $(Ca+Al)/PO_4$ cannot be accomplished by precipitation of calcium, and a soluble material containing the phosphate radical must be added. The reduction of the mole ratio is preferably accomplished during extraction to avoid needless complication of process steps but can be carried out immediately after the extraction step or after the separation step if desired. It is economically desirable to use as small a quantity of sulfuric acid as is operable to give this reduced mole ratio, and sufficient nitric acid to give the desired $N:P_2O_5$ ratio in the fertilizer product. If desired, part of the nitric acid can be added after the separation step. If the nitric acid used for extraction is about the minimum required for solubilization of the $P_2O_5$, the proportion of calcium solubilized will be at a minimum.

The concentration of acid fed to the extraction step is immaterial. For instance, the acid may be premixed with water and introduced as a single stream; separate streams of concentrated acid and water may be introduced; or concentrated acid may be mixed with the ore and the resulting mixture later diluted to give the desired ratio of solids to liquid in the slurry. Preferably, at least a part of the liquid required in the extraction step is obtained by recycle of liquid from a later separation step, which results in a more concentrated solution for ammoniation later.

The extraction can be carried out either batchwise or continuously. In batchwise extraction it is possible to add the ore, acid or acids, water, and/or recycled liquor in any sequence; but we prefer to add the sulfuric acid last and from 0.5 to 30 minutes before a subsequent separation step. We have found that addition of sulfuric acid at this point in the batchwise process results in noticeable improvement in filterability of the slurry. Maximum improvement in filterability is obtained by adding the sulfuric acid about 1 to 10 minutes before the separation step.

In continuous operation one or more, but preferably a series of three to six, extraction vessels may be used. When nitric acid is used alone, it is added preferably in the first extraction vessel, but the total quantity may be divided and portions may be introduced into any of the extraction vessels in the series. The same is true when sulfuric acid is used alone. Water or recycled liquor may be premixed with the acid or may be introduced as separate streams into any of the extraction vessels. The ore may also be mixed with the required quantity of concentrated acid to form a semisolid paste and then leached with sufficient recycle liquor or water to extract the soluble materials.

When both nitric and sulfuric acids are used, all or part of the nitric acid may be added to any extraction vessel, but preferably all the nitric acid is added to the first extraction vessel. All or part of the sulfuric acid may be added to any extraction vessel. If desired, the nitric acid and sulfuric acid may be premixed. Good filtration can be obtained by adding the nitric acid to the first tank and adding the sulfuric acid to the second or third tank.

We have found, however, that improved filterability occurs if one third of the total sulfuric acid required is added to the first extractor, one third to a second extractor, and one third to a third extractor. Further improvement in filterability also occurs if the concentration of the sulfuric acid fed to the third extractor is 50 percent or less, preferably about 15 percent or less. Improvement in filtration is obtained also by retaining the slurry in a holding tank for 2 to 60 minutes after the addition of the sulfuric acid.

Under the conditions described above the proportion of $P_2O_5$ dissolved from the ore is well over 90 percent, and usually 95 percent or more of the total content of the ore, while only about 40 to 60 percent of the alumina is dissolved. The solid materials suspended in the liquid extract are in such physical condition that filtration or separation by other means is easy and rapid.

The total extract is then passed to a separation step. If desired, all the insoluble material can be separated from the liquid extract. If the separation is not perfect, however, and a little of the insoluble residue remains in the extract, no harm results other than dilution of the fertilizer product.

Filtration is the preferred method for separating liquid extract from solid residue, although other methods may be substituted therefor or combined therewith. Separation by centrifuging is satisfactory, although removal of all the insolubles usually is more difficult than when filtration is used.

If desired, the separation can be made in two stages: first passing the extract through a classifier to remove rapidly settling material and then to a suitable filter to remove all or most of the remaining insoluble matter.

We have found that a significant increase in speed of filtration occurs when the temperature is reduced to the range of 50° to 70° C. and that only mild agitation of the liquid should be permitted during filtration, since strong agitation usually lowers the filtration rate. Solid residue is washed and discarded, and the resulting liquid extract is passed on to a liquid ammoniation step. The liquor from washing of the cake can be mixed with the liquor obtained in the separation step, but we prefer to recycle the liquor obtained on washing back to the extraction step described above.

Ammoniation of the liquid extract can be carried out in a number of ways. Either batchwise or continuous ammoniation in one or more stages may be used. Gaseous or liquid anhydrous ammonia or water solution of ammonia also may be used. We prefer to use anhydrous ammonia to avoid the necessity for evaporating water introduced with the ammonia.

Some extracts thicken after partial ammoniation. Whether an extract will thicken or not depends on the ore, kind of acid, acid proportions, and other factors. For extracts that thicken it is desirable to use special mixing equipment in the ammoniation step. We have found that the following types of mixing equipment are satisfactory for ammoniation:

A. A revolving cone mixer (see Perry, J. H., Chemic Engineers Handbook, 3rd ed., pp. 1210–13. McGraw Hill Book Co., New York, 1950).
B. A helix in a draft tube or soap-crutcher type (s Perry, op. cit., and Weber, A. P., Chem. Eng. 6 183–87, October 1953).
C. Multiple paddles closely spaced on a vertical sha These mixers are satisfactory for use with the extra from most ores. Extracts from some ores, however, a unusually thick and complete ammoniation in the liqu state is difficult. These extracts can be ammoniated pa tially in the liquid state. The partially ammoniated e tract is then mixed with recycled dried fines to form a w solid, which is ammoniated further. The extract from an ore can be ammoniated in such two-step method, however, if desired.

Single-stage continuous ammoniation is preferred unle the $(Ca+Al)/PO_4$ mole ratio is greater than 1.0. If th mole ratio is greater than 1.0, we have found that mult ple-stage ammoniation is preferable in order to obta high citrate solubility of the $P_2O_5$ in the product.

We have also found that increased water solubility the $P_2O_5$ in the product is obtained if single-stage an moniation is used with or without cooling or if multipl stage ammoniation is used with cooling. Single-stage an moniation without cooling is preferred, except when th $(Ca+Al)/PO_4$ ratio is 1.0 or more.

If potash is desired in the final product, a potassiu salt such as potassium chloride, potassium sulfate, langbeinite can be added before, after, or during an moniation.

The ammoniated extract may be passed directly to mixing step and there mixed with sufficient product fin to convert it to a wet solid that can be granulated. Th mixing and granulation may be carried out in separa equipment, or suitable equipment may be chosen to allo both mixing and granulation in the same equipment. double-shaft pugmill is a type of mixer that is satisfa tory for both mixing and granulation. If desired, th ammoniated extract can be partially dried by evaporatic of part of the contained water before being mixed wi recycled fines; by proper control of the partial dryir step, it is possible to omit the mixing step and pass th partially dried material directly to the granulation ste If the extract is incompletely ammoniated, additional an monia can be added during the mixing step. Suitab equipment can be chosen so that it is possible to can out these mixing and ammoniation steps in a single pie of apparatus, thus reducing equipment costs. If this done, these steps will overlap, i. e., mixing and ammoni tion will be concomitant. If potash is desired in th finished product, suitable potash salts may be added b fore, during, or after the ammoniation step or in th mixing step.

The material is then dried, crushed, and sized. Sizir ordinarily is accomplished by merely screening to sep rate size particles desired in the finished product fro oversize, which is returned to the crushing step, and fine which are recycled to the mixing step. The finishe products have been shown by pot and field tests to t excellent fertilizers and have good physical properties.

*Example 1*

Florida leached-zone ore containing about 15 perce $P_2O_5$, 10 percent $Al_2O_3$, 11 percent CaO, and 1.2 perce F was crushed to reduce the lumps to a maximum size 1 inch and was calcined at 1100° to 1150° C. in a rota kiln at the rate of 850 pounds per hour. The retentio time of the material in the kiln was about 1 hour. Abou one third of the fluorine was volatilized from the or during calcination. The calcined ore was then crushe so that it all passed through a 4-mesh screen, 85 perce through a 10-mesh screen, and 10 percent through a 10( mesh screen. The crushed calcined ore was fed at th rate of 300 pounds per hour to the first extractor of a con tinuous extraction train consisting of a total of five extractors. Approximately 114 pounds per hour of 42-percent nitric acid was fed to the first extractor. Recycle wash liquor from the filter also was fed to the first extractor at the rate of 195 pounds per hour. Approximately 142 pounds per hour of 50-percent sulfuric acid was fed to the third extractor. From the third extractor the slurry flowed through a fourth and a fifth tank which served primarily as holding tanks to help condition the slurry for improved filterability. The total quantity of $HNO_3$ was 2.2 moles per mole of $P_2O_5$ contained in the ore. The total quantity of $H_2SO_4$ was 2.2 moles per mole of $P_2O_5$ contained in the ore. The total retention time of the slurry in the five extractors was 90 minutes. External heat was used in the first two tanks to give a slurry temperature of about 75° C. External heat was not used in the last three extractors, and the slurry was cooled to about 60° C. prior to filtration. About 97 percent of the $P_2O_5$ in the ore was solubilized.

The slurry from the fifth extractor was filtered on a rotary drum filter covered with a Saran cloth having a monofilament weave. Filtration was easy and rapid. Samples of the slurry also filtered easily and rapidly using a Buchner funnel. After washing with water to remove most of the solubilized $P_2O_5$, the filter cake was discarded.

The filtrate contained 93 percent of the $P_2O_5$ originally present in the ore, but only 60 percent of the $Al_2O_3$. The mole ratio of $(Ca+Al)/PO_4$ was 0.7. The filtrate was completely ammoniated in the liquid state in a continuous one-stage ammoniator using gaseous anhydrous ammonia. The flow rates of liquid extract and ammonia were adjusted so that the pH of the material in the ammoniator was within the range 6.0 to 6.5. The material in the ammoniator became very thick, but ammoniation was carried out without difficulty. The retention time of the material in the ammoniator was about 12 minutes. Potassium chloride was added to the ammoniated material.

Product fines were then mixed with the thickened ammoniated material until wet and granular solids were formed. The wet granules with a moisture content of about 25 percent were dried at 90° to 95° C. After drying, the material was screened to give a fertilizer product that would pass through a 10-mesh screen and would be retained on a 20-mesh screen. The oversize (+10 mesh) was crushed and added to the fines (−20 mesh), and the combined fines were returned to the mixing and granulation step described above. Physical properties of the screened product were unusually good. The product was granular, noncaking in storage, free flowing, and did not decompose in storage. Chemical analysis of the fertilizer product was as follows:

| Percent by weight | | | | | | | |
|---|---|---|---|---|---|---|---|
| Total N | Ammonia N | $P_2O_5$ | | | $Al_2O_3$ | CaO | $K_2O$ |
| | | Total | Citrate soluble | Water soluble | | | |
| 12.8 | 8.6 | 18.6 | 18.6 | 5.6 | 8.1 | 1.5 | 15.0 |

About 30 percent of the $P_2O_5$ in the product was water soluble, and 100 percent was soluble in neutral ammonium citrate (A. O. A. C. standard test). Agronomic tests of material prepared in an approximately similar manner indicated that the product is an effective fertilizer.

*Example II*

Florida leached-zone ore containing 17 percent $P_2O_5$, 14 percent $Al_2O_3$, and 12 percent CaO was crushed to reduce the lumps to a maximum size of 1 inch and was calcined at 1100° C. in a rotary kiln. The retention time of the material in the kiln was about 30 minutes. The calcined ore was crushed to pass a 60-inch screen. About 20 pounds of the crushed calcined ore was extracted batchwise with 33.6 pounds of 20-percent sulfuric acid for 1 hour at 80° C. The total quantity of sulfuric acid was 2.7 moles of $H_2SO_4$ per mole of $P_2O_5$ contained in the ore. About 87 percent of the $P_2O_5$ in the ore was solubilized. The slurry was filtered easily and rapidly. The filtrate was ammoniated batchwise to a pH of about 8. The ammoniated material was dried, crushed, and screened. The screened product was free flowing, noncaking in storage, and did not decompose in storage. Chemical analysis of the fertilizer product was as follows:

| Percent by weight | | | | | | | |
|---|---|---|---|---|---|---|---|
| Total N | Ammonia N | $P_2O_5$ | | | $Al_2O_3$ | CaO | $SO_4$ |
| | | Total | Citrate soluble | Water soluble | | | |
| 13.7 | 13.7 | 22.7 | 22.6 | 8.4 | 10.3 | 0.5 | 34.6 |

The $(Ca+Al)/PO_4$ mole ratio in the product was 0.66. About 37 percent of the $P_2O_5$ in the screened fertilizer product was water soluble (A. O. A. C. standard test); over 99 percent was soluble in neutral ammonium citrate. Agronomic tests indicated that the material is an effective fertilizer.

*Example III*

Florida leached-zone ore containing 10.5 percent $P_2O_5$, 15 percent $Al_2O_3$, and 1.5 percent CaO was crushed to reduce the lumps to a maximum size of 1 inch and was calcined in a rotary kiln at 1100° C. The retention time of the material in the kiln was about 45 minutes. The calcined ore was crushed to minus ¼ inch and was extracted with nitric and sulfuric acids for 30 minutes at 80° C. The ore was extracted in 100-pound batches with 51 pounds of 42-percent nitric acid and 3.1 pounds of 96-percent sulfuric acid. The slurry was diluted with 57 pounds of water. The mole ratio of $HNO_3$ to $P_2O_5$ contained in the ore was 4.4; the mole ratio of $H_2SO_4$ to $P_2O_5$ contained in the ore was 0.4. About 95 percent of the $P_2O_5$ was extracted. The extraction slurry was filtered. The $(Ca+Al)/PO_4$ mole ratio in the filtrate was 1.29. Sufficient concentrated phosphoric acid was added to the filtrate to reduce the $(Ca+Al)/PO_4$ mole ratio to 0.94. Nitric acid was added to the adjusted solution to maintain the $HNO_3/P_2O_5$ mole ratio at 4.4. The liquid extract was ammoniated with gaseous anhydrous ammonia to a pH of about 1.5, at which time potassium chloride was added; ammoniation was continued until the material became very thick. The partially ammoniated material which contained 0.8 mole of $NH_3$ per mole of nitrate nitrogen was partially dried and then granulated. The granules were then further ammoniated until ammonia was no longer retained. The dried, completely ammoniated product had the following composition:

| Percent by weight | | | | | | | | |
|---|---|---|---|---|---|---|---|---|
| Total N | Ammonia N | $P_2O_5$ | | | $Al_2O_3$ | CaO | $SO_4$ | $K_2O$ |
| | | Total | Citrate soluble | Water soluble | | | | |
| 14.9 | 8.4 | 15.3 | 15.0 | 4.1 | 8.7 | 1.9 | 1.0 | 15.7 |

About 27 percent of the $P_2O_5$ in the product was water soluble. The product was granular, noncaking in storage, free flowing, and did not decompose in storage. Agronomic tests indicated that the product was an effective fertilizer.

Example IV

Florida leached-zone ore containing 11 percent $P_2O_5$, 15 percent $Al_2O_3$, and 1.5 percent CaO was crushed to reduce the lumps to a maximum size of 1 inch and was calcined at 1020° C. in a rotary kiln. The retention time of the material in the kiln was about 30 minutes. Approximately 162 pounds of the calcined ore was crushed to minus 60 mesh and extracted with 100 pounds of 42-percent nitric acid for 40 minutes at 90° C. The mole ratio of $HNO_3$ to $P_2O_5$ contained in the ore was 5.0. The slurry was diluted with about 100 pounds of recycle liquor. About 98 percent of the $P_2O_5$ was solubilized. The slurry was filtered, and the filtrate was ammoniated continuously in one stage with gaseous anhydrous ammonia until the material became very thick. The partially ammoniated material, which contained 0.6 mole of $NH_3$ per mole of nitrate nitrogen was mixed with recycle product fines to form wet granules containing about 34 percent moisture. The wet granules were ammoniated, dried, crushed, and screened. The fines were returned to the mixing step. All the $P_2O_5$ in the screened product was soluble in neutral ammonium citrate. The dried product contained 19.0 percent total $P_2O_5$, 19.0 percent citrate soluble $P_2O_5$, 19.1 percent total N, and 9.8 percent ammonia nitrogen.

Example V

Florida leached-zone ore containing 15 percent $P_2O_5$, 9 percent $Al_2O_3$, and 12 percent CaO was crushed to reduce the lumps to a maximum size of 1 inch and was calcined at 1100° C. in a rotary kiln. The retention time of the material in the kiln was about 30 minutes. Approximately 450 pounds per hour of ore, 173 pounds per hour of 42-percent nitric acid, and 470 pounds per hour of recycle liquor were fed to the first extractor; 147 pounds of 50-percent sulfuric acid per hour were fed to the third extractor. The mole ratio of $HNO_3$ to $P_2O_5$ contained in the ore was 2.2. The mole ratio of $H_2SO_4$ to $P_2O_5$ contained in the ore was 1.4. Five extraction tanks were used. The total retention time in the five tanks was 65 minutes. About 96 percent of the $P_2O_5$ was solubilized. The slurry from the fifth extractor was filtered on a rotary drum filter.

The mole ratio of $HNO_3$ to $P_2O_5$ in the filtrate was increased from 2.2 to 4.1 by adding nitric acid to the filtrate. The $(Ca+Al)/PO_4$ mole ratio in the filtrate was reduced from 0.83 to 0.78 by adding sulfuric acid to the filtrate. The treated filtrate was refiltered on the rotary drum filter to remove the precipitated calcium sulfate.

The refiltered filtrate was completely ammoniated in the liquid state in a continuous one-stage ammoniator using gaseous anhydrous ammonia. The flow rates of liquid extract and ammonia were adjusted so that the pH of the material in the ammoniator was about 8.0. Potassium chloride was added to the ammoniated material. After potash addition the ammoniated material contained about 60 percent moisture. The moisture in the ammoniated material was reduced from 60 to 36 percent by partially drying at about 76° C. in a rotary gas-fired drier. Product fines were then mixed in a pugmill with the partially dried material to give wet granular solids. The wet granules with a moisture content of about 8 percent were dried at about 77° C. After drying, the material was screened to give a fertilizer product that would pass through a minus 10-mesh screen and would be retained on a 20-mesh screen. The oversize (+10 mesh) was crushed and added to the fines (−20 mesh), and the combined fines were returned to the mixing step described above. Physical properties of the screened product were excellent. The product was granular, noncaking in storage, free flowing, and did not decompose in storage. Agronomic tests indicated that the product is an effective fertilizer. Chemical analysis of the granular product was as follows:

| Percent by weight | | | | | | | |
|---|---|---|---|---|---|---|---|
| Total N | Ammonia N | $P_2O_5$ | | | $Al_2O_3$ | CaO | $K_2O$ |
| | | Total | Citrate soluble | Water soluble | | | |
| 14.8 | 8.3 | 16.1 | 16.0 | 5.2 | 7.1 | 2.1 | 15.2 |

Example VI

Florida leached-zone ore (15% $P_2O_5$, 9% $Al_2O_3$, and 12% CaO) was crushed to reduce lumps to less than 1 inch and calcined at 1100° C. in a rotary kiln. The calcined ore was crushed to pass a 12-mesh screen. The extraction of the calcined crushed ore was carried out in an extraction train consisting of three tanks connected in series. Approximately 10.5 pounds per hour of ore, 4.3 pounds per hour of 41-percent nitric acid, and 16.4 pounds per hour of recycled wash liquor from the filter were fed to the first tank. Approximately 1.1 pounds per hour of 49-percent sulfuric acid was fed to each of the three tanks. The mole ratio of $HNO_3$ to $P_2O_5$ contained in the ore was 2.2. The mole ratio of total $H_2SO_4$ to $P_2O_5$ was 1.4. The sulfuric acid flow to each tank was about 0.46 mole per mole of $P_2O_5$ contained in the ore fed to the first tank. The total retention time of the slurry in all three tanks was 21 minutes. External heat was used to maintain a temperature of 95° C. in the first two tanks and 87° C. in the third tank.

The extraction slurry was filtered after accumulating in a vessel. A fair filtration rate was obtained.

The flow of sulfuric acid fed to the third tank was changed to 3.9 pounds per hour of 14-percent sulfuric acid. A pronounced increase in filtration rate resulted. About 95 percent of the $P_2O_5$ in the ore was solubilized.

We claim as our invention:

1. A process for the production of fertilizer which comprises completely calcining a high-alumina phosphate ore at temperatures in the range from about 800° to 1200° C.; crushing the calcined ore at least fine enough to pass through a screen having ½-inch openings; extracting the crushed ore with an aqueous solution of a material selected from the group consisting of nitric acid, sulfuric acid, and mixtures thereof, in quantity sufficient to supply from 2.0 to 10.0 moles of acid per mole of $P_2O_5$ and sufficient to give 5 percent to 75 percent solid matter in the resulting slurry; maintaining the temperature of the slurry in the range from about 80° to 100° C. during extraction; reducing the temperature to about 50° to 70° C.; separating the liquid phase of said slurry from solid materials contained therein; ammoniating the separated liquid phase to a pH in the range from 3.0 to 9.0; granulating and drying the resulting material; and withdrawing a homogeneous, granular, noncaking fertilizer product having a high proportion of its phosphate content in citrate-soluble form.

2. A process for the production of fertilizer which comprises calcining a high-alumina phosphate ore in lumps small enough to pass a screen having 1-inch openings for about ½ hour at temperatures in the range from about 1000° to 1150° C.; crushing the calcined ore fine enough that almost all will pass through a screen having ¼-inch openings; extracting the crushed ore with an aqueous solution of a material selected from the group consisting of nitric acid, sulfuric acid, and mixtures thereof, in quantity sufficient to supply from 2.0 to 10.0 moles of acid per mole of $P_2O_5$ and sufficient to give 15 percent to 50 percent solid matter in the resulting slurry; maintaining the temperature of the slurry in the range from about 80° to 100° C. during extraction; reducing the temperature to about 50° to 70° C.; separating the liquid phase of said slurry from solid materials contained therein; ammoniating the separated liquid phase to a pH in the range from 3.0 to 9.0; granulating and drying the resulting material; and withdrawing a homegeneous, granular, noncaking fertilizer product having a high proportion of its phosphate content in citrate-soluble form.

3. A process for the production of fertilizer which comprises completely calcining a high-alumina phosphate ore at temperatures in the range from about 800° to 1200° C.; crushing the calcined ore at least fine enough to pass through a screen having ¼-inch openings; extracting the crushed ore with an aqueous solution of a material selected from the group consisting of nitric acid, sulfuric acid, and mixtures thereof, in quantity sufficient to supply from 2.0 to 10.0 moles of acid per mole of $P_2O_5$ and sufficient to give 15 percent to 50 percent solid matter in the resulting slurry; maintaining the temperature of the slurry in the range from about 80° to 100° C. during extraction; adjusting the mole ratio of $(Ca+Al)/PO_4$ in the liquid phase of the slurry to less than 1.0; separating the liquid phase of said slurry from solid materials contained therein; ammoniating the separated liquid phase to a pH in the range from 3.0 to 9.0; granulating and drying the resulting material; and withdrawing a homogeneous, granular, noncaking fertilizer product having high proportions of its phosphate content in citrate-soluble and in water-soluble forms.

4. A process for the production of fertilizer which comprises completely calcining a high-alumina phosphate ore at temperatures in the range from about 800° to 1200° C.; crushing the calcined ore at least fine enough to pass through a screen having ¼-inch openings; extracting the crushed ore with an aqueous solution of a material selected from the group consisting of nitric acid, sulfuric acid, and mixtures thereof, in quantity sufficient to supply from 2.0 to 10.0 moles of acid per mole of $P_2O_5$ and sufficient to give 15 percent to 50 percent solid matter in the resulting slurry; maintaining the temperature of the slurry in the range from about 80° to 100° C. during extraction; adjusting the mole ratio of $(Ca+Al)/PO_4$ in the liquid phase of the slurry to less than 1.0; reducing the temperature to about 50° to 70° C.; separating the liquid phase of said slurry from solid materials contained therein; ammoniating the separated liquid phase to a pH in the range from 3.0 to 9.0 in a single stage; granulating and drying the resulting material; and withdrawing a homogeneous, granular, noncaking fertilizer product having high proportions of its phosphate content in citrate-soluble and in water-soluble forms.

5. A process for the production of fertilizer which comprises completely calcining a high-alumina phosphate ore at a temperature in the range from about 800° to 1200° C.; crushing the ore at least fine enough to pass through a screen having ½-inch openings; extracting the crushed ore batchwise with an aqueous solution of nitric and sulfuric acids formed in place by mixing aqueous nitric acid with the ore and later adding sulfuric acid to the mixture; controlling the quantity and concentration of such acids so that from 0.5 to 10.0 moles of acid per mole of $P_2O_5$ and from 5 percent to 75 percent of solid matter are present in the resulting slurry; separating solid matter from the slurry from 0.5 to 30 minutes after adding sulfuric acid thereto; ammoniating the resulting aqueous liquor to a pH in the range from 3.0 to 9.0; granulating and drying the resulting thickened material; and withdrawing a homogeneous, granular, noncaking fertilizer product having a high proportion of its phosphate content in citrate-soluble form.

6. A process for the production of fertilizer which comprises completely calcining a high-alumina phosphate ore at a temperature in the range from about 800° to 1200° C.; crushing the ore at least fine enough to pass through a screen having ¼-inch openings; extracting the crushed ore batchwise with an aqueous solution of nitric and sulfuric acids formed in place by mixing aqueous nitric acid with the ore and later adding sulfuric acid to the mixture; controlling the quantity and concentration of such acids so that from 0.5 to 10.0 moles of acid per mole of $P_2O_5$ and from 5 percent to 75 percent of solid matter are present in the resulting slurry; heating the slurry to a temperature in the range from about 80° to 100° C.; adjusting the mole ratio of $(Ca+Al)/PO_4$ in the slurry to less than 1.0; separating solid matter from the slurry from 2 to 10 minutes after adding sulfuric acid thereto; ammoniating the resulting aqueous liquor in a single stage to a pH in the range from 3.0 to 9.0; granulating and drying the resulting thickened material; and withdrawing a homogeneous, granular, noncaking fertilizer having high proportions of its phosphate content in citrate-soluble and water-soluble forms.

7. A process for the production of fertilizer which comprises completely calcining a high-alumina phosphate ore at a temperature in the range from about 800° to 1200° C.; crushing the ore at least fine enough to pass through a screen having ½-inch openings; continuously extracting the crushed ore with an aqueous solution of nitric and sulfuric acids in a series of three to six extraction vessels; introducing the sulfuric acid component of the aqueous solution in three substantially equal portions, adding one portion to a first vessel in the series, a second portion to a second vessel, and a third portion to a third vessel in the consecutive series; introducing said third portion of sulfuric acid at a concentration of less than 50 percent; controlling the total quantity and concentration of said aqueous solution so that from 0.5 to 10.0 moles of acid and from 5 percent to 75 percent total solids are present in the resulting slurry; separating solid matter from the liquid phase of said slurry; ammoniating the separated liquid to a pH in the range from 3.0 to 9.0; granulating and drying the resulting thickened material; and withdrawing a homogeneous, granular, noncaking fertilizer product having a high proportion of its phosphate content in citrate-soluble form.

8. A process for the production of fertilizer which comprises completely calcining a high-alumina phosphate ore at a temperature in the range from about 800° to 1200° C.; crushing the ore at least fine enough to pass through a screen having ½-inch openings; continuously extracting the crushed ore with an aqueous solution of nitric and sulfuric acids in a series of three to six extraction vessels; introducing the sulfuric acid component of the aqueous solution in three substantially equal portions, adding one portion to a first vessel in the series, a second portion to a second vessel, and a third portion to a third vessel in the consecutive series; introducing said third portion of sulfuric acid at a concentration of less than 15 percent; controlling the total quantity and concentration of said aqueous solution so that from 0.5 to 10.0 moles of acid and from 5 percent to 75 percent total solids are present in the resulting slurry; heating the slurry to about 80° to 100° C. during extraction; adjusting the $(CA+Al)/PO_4$ mole ratio to less than 1.0; cooling the slurry to about 50° to 70° C.; separating solid matter from the liquid phase of said slurry; ammoniating the separated liquid in a single stage to a pH in the range from 3.0 to 9.0; granulating and drying the resulting thickened material; and withdrawing a homogeneous, granular, noncaking fertilizer product having high proportions of its phosphate content in citrate-soluble and water-soluble forms.

9. A process for the production of fertilizer which comprises completely calcining a high-alumina phosphate ore at temperatures in the range from about 800° to 1200° C.; crushing the calcined ore at least fine enough to pass through a screen having ¼-inch openings; extracting the crushed ore with an aqueous solution of a material selected from the group consisting of nitric acid, sulfuric acid, and mixtures thereof, in quantity sufficient to supply from 2.0 to 10.0 moles of acid per mole of P₂O₅ and sufficient to give 15 percent to 50 percent solid matter in the resulting slurry; maintaining the temperature of the slurry in the range from about 80° to 100° C. during extraction; adjusting the mole ratio of $(Ca+Al)/PO_4$ in the liquid phase of the slurry to less than 1.0; separating the liquid phase of said slurry from solid materials contained therein; ammoniating the separated liquid phase to a pH in the range from 5.0 to 7.0; granulating and drying the resulting material; and withdrawing a homogeneous, granular, noncaking fertilizer product having high proportions of its phosphate content in citrate-soluble and in water-soluble forms.

References Cited in the file of this patent

UNITED STATES PATENTS

| | | |
|---|---|---|
| 252,029 | Gibbons et al. | Jan. 10, 1882 |
| 276,143 | Knight | Apr. 17, 1883 |
| 1,671,765 | Harned | May 29, 1928 |
| 2,448,126 | Shoeld | Aug. 31, 1948 |